United States Patent
Foster et al.

(10) Patent No.: US 10,053,105 B2
(45) Date of Patent: Aug. 21, 2018

(54) DRIVE MODE SELECTION FOR AN AUTONOMOUS VEHICLE

(71) Applicants: CNH Industrial America LLC, New Holland, PA (US); Autonomous Solutions, Inc., Mendon, UT (US)

(72) Inventors: Christopher A. Foster, Mohnton, PA (US); John H. Posselius, Ephrata, PA (US); Michael G. Hornberger, Weston, ID (US); Daniel John Morwood, Petersboro, UT (US); Bret Todd Turpin, Wellsville, UT (US); Benjamin Craig Spendlove, Smithfield, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 261 days.

(21) Appl. No.: 14/995,068

(22) Filed: Jan. 13, 2016

(65) Prior Publication Data

US 2017/0197621 A1 Jul. 13, 2017

(51) Int. Cl.
*B60W 30/188* (2012.01)
*B60W 10/06* (2006.01)
(Continued)

(52) U.S. Cl.
CPC ........ *B60W 30/1888* (2013.01); *B60W 10/06* (2013.01); *B60W 10/11* (2013.01);
(Continued)

(58) Field of Classification Search
None
See application file for complete search history.

(56) References Cited

U.S. PATENT DOCUMENTS

| 1,490,374 A | 4/1924 | Foote |
| 2,982,153 A | 5/1961 | Albertson et al. |

(Continued)

FOREIGN PATENT DOCUMENTS

CN 2837619 Y 11/2006

OTHER PUBLICATIONS

John Deere, John Deere Infinitely Variable Transmission (IVT), Aug. 29, 2002.

(Continued)

*Primary Examiner* — Justin Holmes
(74) *Attorney, Agent, or Firm* — Rebecca L. Henkel; Rickard K. DeMille (57) ABSTRACT

A method for controlling an off-road vehicle includes selecting an operating mode from a plurality of candidate operating modes. The plurality of candidate operating modes includes a first operating mode that includes substantially maintaining a first desired vehicle speed of the off-road vehicle; a second operating mode that includes substantially maintaining a first desired gear ratio of the transmission and substantially maintaining a first desired engine speed of the engine; a third operating mode that includes substantially maintaining a second desired vehicle speed of the off-road vehicle and substantially maintaining a second desired engine speed of the engine; and a fourth operating mode that includes substantially maintaining a third desired gear ratio of the transmission and substantially maintaining a third desired vehicle speed of the off-road vehicle.

19 Claims, 8 Drawing Sheets

(51) Int. Cl.
*B60W 10/11* (2012.01)
*B60W 30/14* (2006.01)
*B60W 50/00* (2006.01)

(52) U.S. Cl.
CPC ... *B60W 30/143* (2013.01); *B60W 2050/0026* (2013.01); *B60W 2300/152* (2013.01); *B60W 2710/0644* (2013.01); *B60W 2710/1005* (2013.01); *B60W 2720/10* (2013.01)

(56) References Cited

U.S. PATENT DOCUMENTS

| | | | |
|---|---|---|---|
| 3,132,533 | A | 5/1964 | Baker |
| 4,373,597 | A | 2/1983 | Itatani et al. |
| 4,698,048 | A | 10/1987 | Rundle |
| 4,726,256 | A | 2/1988 | von Kaler et al. |
| 6,523,429 | B2 | 2/2003 | Desmarchelier et al. |
| 8,109,852 | B2 | 2/2012 | Lee |
| 8,554,426 | B2 | 10/2013 | Hou |
| 8,561,490 | B2 | 10/2013 | Benassi et al. |
| 8,874,332 | B2 | 10/2014 | Davis et al. |
| 2006/0079374 | A1* | 4/2006 | Iriyama ............... F02D 37/02 477/107 |
| 2008/0004156 | A1* | 1/2008 | Tabata ............... B60K 6/365 477/3 |
| 2008/0140290 | A1* | 6/2008 | Kuwahara ............ B60W 10/06 701/54 |
| 2009/0318264 | A1* | 12/2009 | Suzuki ............... F16H 61/0437 477/140 |
| 2014/0026691 | A1 | 1/2014 | Huber et al. |
| 2016/0052508 | A1* | 2/2016 | Teraya ............... F01N 3/20 701/22 |

OTHER PUBLICATIONS

C. N. Howard, Testing the Fuel Efficiency of Tractors With Continuously Variable and Standard Geared Transmissions, Apr. 2013.
Lamborghini Trattori, Lamborghini Nitro 130 VRT, class with the advantages of a continuously variable transmission, Nov. 9, 2013.

* cited by examiner

DRIVE MODE SELECTION FOR AN AUTONOMOUS VEHICLE

BACKGROUND

The present disclosure relates generally to drive mode selection for an autonomous vehicle. In particular, it may be desirable to control a vehicle speed, engine speed, and/or transmission gear ratio of the autonomous vehicle.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In a first embodiment, a method for controlling an off-road vehicle includes selecting an operating mode from a plurality of candidate operating modes. The plurality of candidate operating modes includes a first operating mode that includes substantially maintaining a first desired vehicle speed of the off-road vehicle by controlling an engine of the off-road vehicle and a transmission of the off-road vehicle to reduce a speed error, wherein the speed error is a difference between the first desired vehicle speed and a measured vehicle speed of the off-road vehicle. The plurality of candidate operating modes also includes a second operating mode that includes substantially maintaining a first desired gear ratio of the transmission and substantially maintaining a first desired engine speed of the engine by instructing the transmission to maintain the first desired gear ratio and instructing the engine to maintain the first desired engine speed. The plurality of candidate operating modes further includes a third operating mode that includes substantially maintaining a second desired vehicle speed of the off-road vehicle and substantially maintaining a second desired engine speed of the engine by instructing the engine to maintain the second desired engine speed and controlling the transmission to establish a second desired gear ratio of the transmission that substantially maintains the second desired vehicle speed. The plurality of candidate operating modes also includes a fourth operating mode that includes substantially maintaining a third desired gear ratio of the transmission and substantially maintaining a third desired vehicle speed of the off-road vehicle by instructing the transmission to maintain the third desired gear ratio and controlling the engine to establish a third desired engine speed that substantially maintains the third desired vehicle speed.

In a second embodiment, a system of an off-road vehicle includes an engine, a transmission coupled to the engine, wherein a gear ratio of the transmission is adjustable; and a controller. The controller is configured to substantially maintain a first desired vehicle speed of the off-road vehicle by controlling the engine and the transmission to reduce a speed error, wherein the speed error is a difference between the first desired vehicle speed and a measured vehicle speed of the off-road vehicle. The controller is also configured to substantially maintain a first desired gear ratio of the transmission and substantially maintain a first desired engine speed of the engine by instructing the transmission to maintain the first desired gear ratio and instructing the engine to maintain the first desired engine speed. The controller is further configured to substantially maintain a second desired vehicle speed of the off-road vehicle and substantially maintaining a second desired engine speed of the engine by instructing the engine to maintain the second desired engine speed and controlling the transmission to establish a second desired gear ratio of the transmission that substantially maintains the second desired vehicle speed. The controller is also configured to substantially maintain a third desired gear ratio of the transmission and substantially maintaining a third desired vehicle speed of the off-road vehicle by instructing the transmission to maintain the third desired gear ratio and controlling the engine to establish a third desired engine speed that substantially maintains the third desired vehicle speed.

In a third embodiment, a method for controlling an autonomous off-road vehicle includes selecting a fourth mode of operation of a control system of the autonomous off-road vehicle upon detecting that the autonomous off-road vehicle is docking with another vehicle, wherein the fourth mode of operation includes substantially maintaining a third desired gear ratio of a transmission of the autonomous off-road vehicle and substantially maintaining a third desired vehicle speed of the autonomous off-road vehicle by instructing the transmission to maintain the third desired gear ratio and controlling an engine of the autonomous off-road vehicle to establish a third desired engine speed of the engine that substantially maintains the third desired vehicle speed. The method also includes selecting a second mode of operation of the control system of the autonomous off-road vehicle upon detecting that an implement is coupled to a power takeoff shaft of the autonomous off-road vehicle and the autonomous off-road vehicle is on rough terrain, wherein the second mode of operation includes substantially maintaining a first desired gear ratio of the transmission and substantially maintaining a first desired engine speed of the engine by instructing the transmission to maintain the first desired gear ratio and instructing the engine to maintain the first desired engine speed. The method further includes selecting a third mode of operation of the control system of the autonomous off-road vehicle upon detecting that the implement is coupled to the power takeoff shaft of the autonomous off-road vehicle and the autonomous off-road vehicle is not on rough terrain, wherein the third mode of operation includes substantially maintaining a second desired vehicle speed of the autonomous off-road vehicle and substantially maintaining a second desired engine speed of the engine by instructing the engine to maintain the second desired engine speed and controlling the transmission to establish a second desired gear ratio of the transmission that substantially maintains the second desired vehicle speed. The method also includes selecting a first mode of operation of the control system upon detecting that the autonomous off-road vehicle is not docking with another vehicle and the implement is not coupled to the power takeoff shaft of the autonomous off-road vehicle, wherein the first mode of operation includes substantially maintaining a first desired vehicle speed of the autonomous off-road vehicle by controlling the engine and the transmission to reduce a speed error, wherein the speed error is a difference between the first desired vehicle speed and a measured vehicle speed of the autonomous off-road vehicle.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments disclosed herein relate generally to controlling aspects of an autonomous vehicle. It may be desirable to control a vehicle speed, engine speed, and/or transmission gear ratio of the autonomous vehicle. Accordingly, systems and methods are disclosed in which one of a set of modes may be selected to control vehicle speed, engine speed, and transmission gears. In particular, one embodiment of the present disclosure includes a method for controlling an off-road vehicle includes selecting an operating mode from a plurality of candidate operating modes. The plurality of candidate operating modes includes a first operating mode that includes substantially maintaining a first desired vehicle speed of the off-road vehicle by controlling an engine of the off-road vehicle and a transmission of the off-road vehicle to reduce a speed error, wherein the speed error is a difference between the first desired vehicle speed and a measured vehicle speed of the off-road vehicle. The plurality of candidate operating modes also includes a second operating mode that includes substantially maintaining a first desired gear ratio of the transmission and substantially maintaining a first desired engine speed of the engine by instructing the transmission to maintain the first desired gear ratio and instructing the engine to maintain the first desired engine speed. The plurality of candidate operating modes further includes a third operating mode that includes substantially maintaining a second desired vehicle speed of the off-road vehicle and substantially maintaining a second desired engine speed of the engine by instructing the engine to maintain the second desired engine speed and controlling the transmission to establish a second desired gear ratio of the transmission that substantially maintains the second desired vehicle speed. The plurality of candidate operating modes also includes a fourth operating mode that includes substantially maintaining a third desired gear ratio of the transmission and substantially maintaining a third desired vehicle speed of the off-road vehicle by instructing the transmission to maintain the third desired gear ratio and controlling the engine to establish a third desired engine speed that substantially maintains the third desired vehicle speed.

Figure 1:
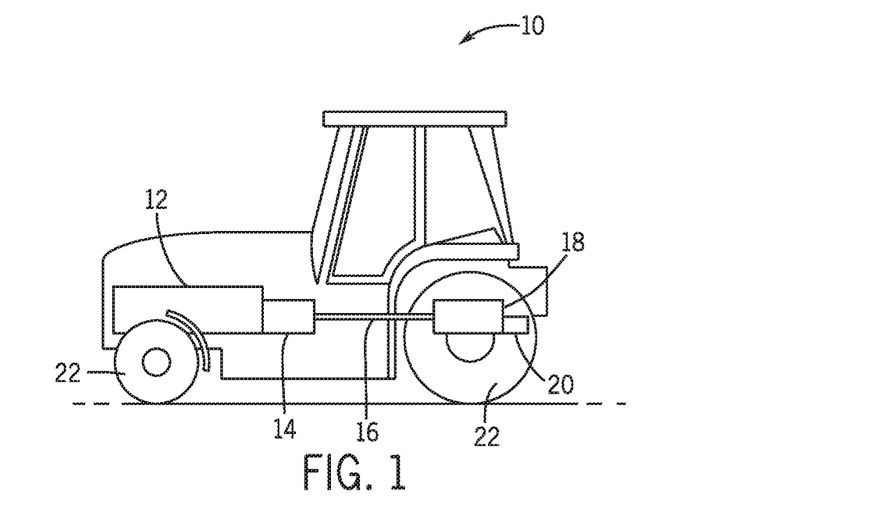
FIG. 1 is a diagram of a tractor in accordance with an embodiment of the present disclosure.

FIG. 1 is a diagram of an off-road vehicle (e.g., a tractor 10), including an engine 12, a transmission 14, a drive shaft 16, a power takeoff (PTO) drive 18, and a PTO shaft 20, in accordance with an embodiment of the present disclosure. The transmission 14 is coupled to the engine 12 to transfer power from the engine 12 to the drive shaft 16, which powers wheels 22 of the tractor 10. The transmission 14 may be a geared transmission or a non-geared transmission, such as a continuously variable transmission. The PTO drive 18 is coupled to the engine 12, such that an input speed of the PTO drive 18 may be approximately equal to a speed of the engine 12. The PTO drive 18 is also coupled to the PTO shaft 20, such that the PTO drive 18 drives the PTO shaft 20. The tractor 10 may be an autonomous tractor, such that the tractor 10 may be driven without operator input or include automated control, but with an operator present (e.g., supervised autonomy).

Figure 2:
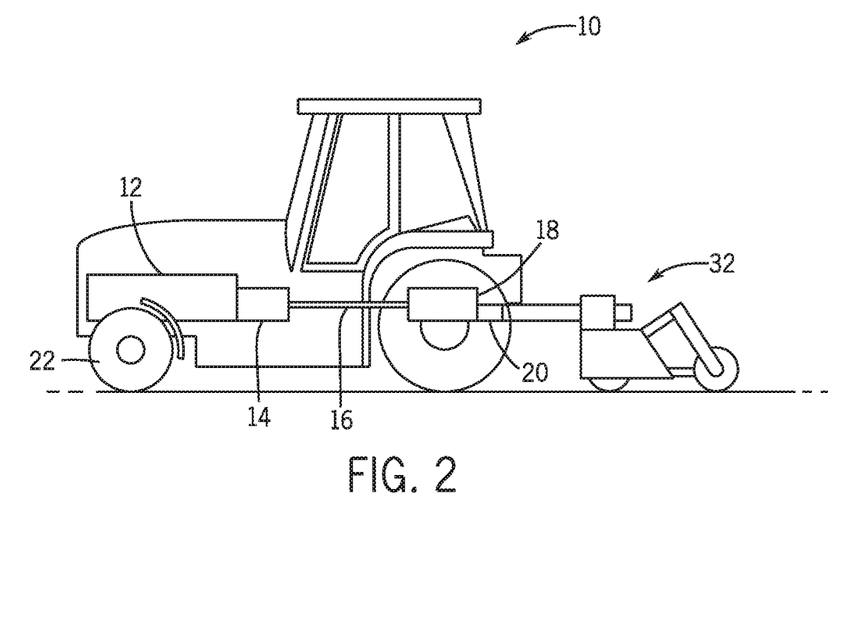
FIG. 2 is a diagram of a tractor coupled to an implement in accordance with an embodiment of the present disclosure.

FIG. 2 is a diagram of a tractor 10 coupled to an implement 32, in accordance with an embodiment of the present disclosure. The implement 32 may be a raker, tillage implement, mower, seeder, or any other implement. The implement 32 may be coupled to the PTO shaft 20 such that the PTO shaft 20 powers certain components on the implement 32. When operating the tractor with the implement 32, it may be desirable to maintain a constant engine speed such that the PTO speed remains constant. For example, a constant PTO shaft speed may be desired when operating a mower (e.g., while mowing a field). In some embodiments, maintaining a constant engine speed and vehicle speed of the tractor 10, while varying a gear ratio of the transmission 14, may be particularly useful when operating the implement 32. In addition, maintaining a gear ratio and engine speed while varying the vehicle speed may be useful when operating the implement 32 on rough or bumpy terrain.

Figure 3:
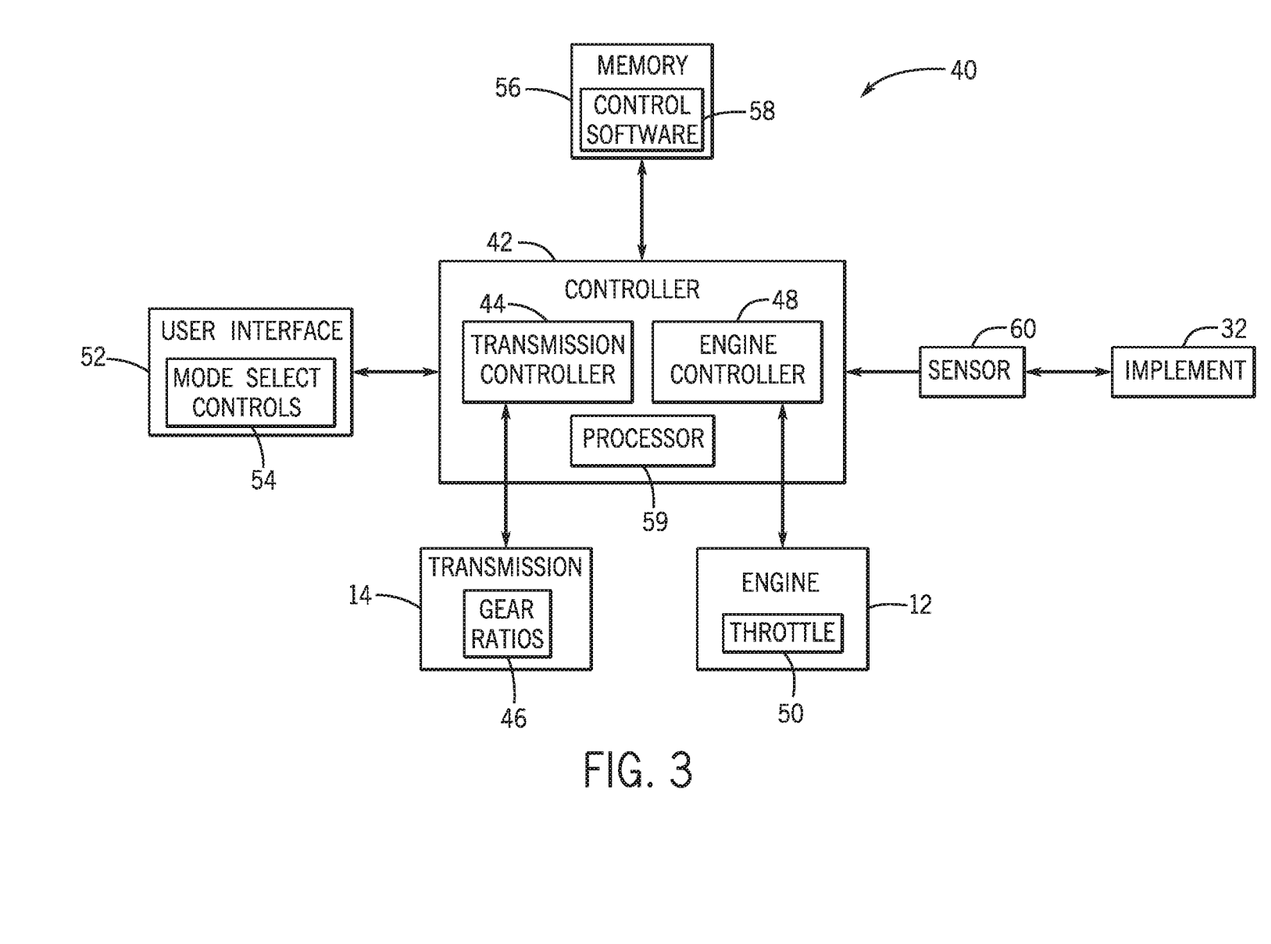
FIG. 3 is a block diagram of a control system that may be employed with the tractor of FIG. 1 and/or FIG. 2 in accordance with an embodiment of the present disclosure.

FIG. 3 is a block diagram of a control system 40 that may be employed within the tractor 10 of FIG. 1 and/or FIG. 2 in accordance with an embodiment of the present disclosure. The control system 40 includes a controller 42 that may output and receive signals to control the components of the tractor 10. In some embodiments, the controller 42 includes a transmission controller 44 that may control the transmission 14 by instructing changes in gear ratios 46 of the transmission 14. The gear ratios 46 may correspond to gears of a geared transmission or gear ratios of a non-geared transmission, such as a continuously variable transmission. In some embodiments, the controller 42 includes an engine controller 48 that may control the engine 12 (e.g., by engaging and/or disengaging a throttle 50 of the engine 12) to establish a desired speed of the engine 12. In some embodiments, one or both of the transmission controller 44 and engine controller 48 may not be separate controllers, but instead incorporated into the controller 42. The controller 42 includes a processor 59 (e.g., a microprocessor) that may execute software, such as software for controlling the tractor 10. Moreover, the processor 59 may include multiple microprocessors, one or more "general-purpose" microprocessors, one or more special-purpose microprocessors, and/or one or more application specific integrated circuits (ASICS), or some combination thereof. For example, the processor 59 may include one or more reduced instruction set (RISC) processors.

The controller 42 may be coupled to a memory device 56 that may store information such as control software 58, look up tables, configuration data, etc. In some embodiments, the memory device 56 may be internal to the controller 42. The memory device 56 may include a volatile memory, such as random access memory (RAM), and/or a nonvolatile memory, such as ROM. The memory device 56 may store a variety of information and may be used for various purposes. For example, the memory device 56 may store processor-executable instructions (e.g., firmware or software) for the processor 59 execute, such as instructions for controlling the tractor 10. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., position data, identification data, etc.), instructions (e.g., software or firmware for controlling the haul vehicle, etc.), and any other suitable data. For example, the memory device 56 may store control software 58 that includes instructions related to the modes in which the tractor 10 may operate. The control software 58 may be executed by the processor 59 to control the tractor 10.

In the illustrated embodiment, the control system 40 includes a user interface 52 that may include input devices (e.g., a mode select control 54, a driver-actuated shift control, a throttle control, etc.) and output devices (e.g., indicators that provide vehicle information to an operator). For example, the user interface 52 may include the mode select control 54 to enable an operator of the tractor 10 to select a mode such that the tractor 10 operates in the selected mode. In particular, the mode select control 54 may be able to select from an automatic mode (wherein the controller 42 selects another mode of operation automatically rather than having an operator select the mode of operation), a first mode (wherein a vehicle speed of the tractor 10 is maintained while varying a gear ratio and engine speed), a second mode (wherein the gear ratio and engine speed are maintained while varying the vehicle speed), a third mode (wherein the engine speed and vehicle speed are maintained while varying the gear ratio), and a fourth mode (wherein the gear ratio and vehicle speed are maintained while varying the engine speed). The control system 40 may include a sensor 60 that may determine, for example, when an implement 32 is coupled to the tractor 10, when the tractor 10 is traveling over rough or bumpy terrain, when the tractor is docking with another vehicle, etc. In some embodiments, the sensor 60 may output a signal to the controller 42 indicative of a parameter associated with the tractor 10 or the implement 32 (e.g., type of implement, operating conditions, etc.).

Figure 4:
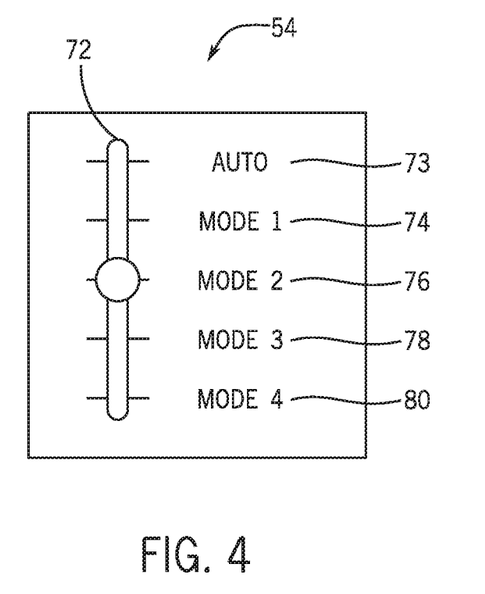
FIG. 4 is a diagram of a mode select control that may be employed within the control system of FIG. 3 in accordance with an embodiment of the present disclosure.

With the foregoing in mind, FIG. 4 is a diagram of a mode select control 54 that may be employed within the control system 40 of FIG. 3 in accordance with an embodiment of the present disclosure. The mode select control 54 includes a mode selector 72 that may be in the form of a handle or knob. It may be appreciated that the mode select control 54 may employ any suitable form of the mode selector 72 such that the mode may be selected (e.g., via buttons, dials, touchscreen inputs, etc.).

The control system 40 may be placed in an automatic mode 73 of operation upon selection of the automatic mode 73 using the mode select control 54. While in the automatic mode 73, the control system 40 may select a mode of operation (among the modes of operation described below) of the tractor 10 automatically (rather than having an operator select the mode of operation).

The control system 40 may be placed in a first mode 74 of operation upon selection of the first mode 74 using the mode select control 54. While the control system 40 is in the first mode 74, the controller 42 may receive an input vehicle speed from the operator, e.g., a target speed of the tractor 10. In some embodiments, a controller (e.g., the controller 42) may determine an appropriate input vehicle speed of the tractor 10 based on a job or mission assigned to the tractor and/or environmental conditions. In some embodiments, a controller remote from the tractor 10 may determine the appropriate input vehicle speed of the tractor 10 and transmit the appropriate vehicle speed to the control system 40 of the tractor 10. While in the first mode 74, a gear ratio 46 of the transmission 14 and the engine speed may vary as the control system 40 substantially maintains the speed of the tractor 10 at the input vehicle speed. Accordingly, the first mode 74 may be referred to as a fixed vehicle speed, variable gear ratio, and variable engine speed mode. For example, the controller 42 may maintain the speed of the tractor 10 at the input vehicle speed by controlling the throttle 50 to reduce a speed error. The speed error may be a mathematical difference between the input vehicle speed and a measured vehicle speed (e.g., measured by a speedometer). In certain embodiments, the speed error may be converted to a throttle command by multiplying the speed error by a gain.

The controller 42 may then output the throttle command to the throttle 50. In some embodiments, the controller 42 may output the throttle command to the engine controller 48. The controller 42 may also output an up-shift command or a down-shift command to the transmission controller 44. The controller 42 may output the up-shift command if the engine speed is higher than a first threshold engine speed (e.g., approximately 1850 revolutions per minute (RPM), a range of 1600 to 2100 RPM, etc.) for longer than a first duration (e.g., 4 seconds, a range of 2 to 6 seconds, etc.), and the current gear ratio is not the maximum gear ratio of the transmission 14. The controller 42 may output the down-shift command if the engine speed is lower than a second threshold engine speed (e.g., 1200 RPM, 1000 to 1400 RPM, etc.) for longer than a second duration (e.g., 4 seconds, a range of 2 to 6 seconds, etc.), and the current gear ratio is not the minimum gear ratio of the transmission 14. Otherwise, the controller 42 may not output a shift command to change the gear ratio 46. In some embodiments, the controller 42 may output the up-shift command or the down-shift command to the transmission controller 44. It may be appreciated that other threshold engine speeds may be used for the first threshold engine speed and second threshold engine speed. It may be appreciated that other durations may be used for the first duration time and the second duration. The first mode 74 of operation may be utilized where the engine speed and gear ratio 46 of the transmission 14 are of lower priority than the vehicle speed. For example, the operator may desire to move the tractor 10 from one point to another point quickly (e.g., at a high speed). Additionally, the first mode 74 may be utilized when an implement that is not powered by the PTO shaft 20 is connected to the tractor 10. With such an implement, the engine speed is lower priority because the implement is not powered by the PTO shaft 20.

In some embodiments, while the control system 40 is in the first mode 74 of operation, the controller 42 may utilize a lookup table containing ratios of vehicle speed to engine speed for each gear ratio 46 of the transmission 14. For example, the controller 42 search the lookup table for the maximum gear ratio that may be used to maintain the input vehicle speed. The controller 42 may only output the downshift command if the current gear ratio is greater than the maximum gear ratio. In some embodiments, the controller 42 may output the shift command to the transmission controller 44. The lookup table may be stored in the memory device 56.

The control system 40 may be placed in a second mode 76 of operation upon selection of the second mode 76 via the mode select control 54. While the control system 40 is in the second mode 76, the controller 42 may receive an input gear ratio 46 and an input engine speed from the operator. In some embodiments, a controller (e.g., the controller 42) may determine an appropriate input gear ratio 46 and an appropriate input engine speed of the tractor 10 based on a job or mission assigned to the tractor and/or environmental conditions. In some embodiments, a controller remote from the tractor 10 may determine the appropriate input gear ratio 46 and the appropriate input engine speed of the tractor 10 and transmit the appropriate input gear ratio 46 and the appropriate input engine speed to the control system 40 of the tractor 10. The controller 42, in turn, substantially maintains the gear ratio 46 of the transmission 14 at the input gear ratio and the speed of the engine 12 at the input engine speed. While the control system 40 is in the second mode 76, the vehicle speed of the tractor 10 may vary as a result of maintaining the gear ratio 46 of the tractor 10 at the input gear ratio and the speed of the engine 12 at the input engine speed. Accordingly, the second mode 76 may be referred to as a fixed gear ratio, fixed engine speed, and variable vehicle speed mode. For example, the controller 42 may output a shift command to engage the input gear ratio of the transmission 14. In some embodiments, the controller 42 may output the shift command to the transmission controller 44. The controller 42 may also output an engine command to maintain the speed of the engine 12 at the input engine speed. In some embodiments, the controller 42 may output the engine command to the engine controller 48. Because the gear ratio 46 of the transmission 14 remains constant, undesirable sharp or jerky movements due to shifting the transmission 14 (e.g., a power shift transmission) may be substantially reduced or eliminated. Maintaining a constant engine speed may induce components of the implement to be driven at a constant speed by the PTO shaft 20. Accordingly, the second mode 76 of operation may be selected for applications in which the implement 32 is powered by the PTO shaft 20 and shifting the gear ratio is undesirable. For instance, when traveling on rocky or bumpy ground, the tractor 10 may vary in vehicle speed as a result of gear ratio slippage of the transmission 14. It may be desirable to select the second mode 76 of operation to maintain the gear ratio 46 and engine speed to reduce or eliminate gear ratio slippage.

The control system 40 may be placed in a third mode 78 of operation upon selection of the third mode 78 using the mode select control 54. While the control system 40 is in the third mode 78, the controller 42 may receive an input engine speed and an input vehicle speed from the operator. In some embodiments, a controller (e.g., the controller 42) may determine an appropriate input engine speed and an appropriate input vehicle speed of the tractor 10 based on a job or mission assigned to the tractor and/or environmental conditions. In some embodiments, a controller remote from the tractor 10 may determine the appropriate input engine speed and the appropriate input vehicle speed of the tractor 10 and transmit the appropriate input engine speed and the appropriate input vehicle speed to the control system 40 of the tractor 10. The controller 42, in turn, substantially maintains the speed of the engine 12 at the input engine speed and the speed of the tractor 10 at the input vehicle speed. While the control system 40 is in the third mode 78, the gear ratio 46 of the transmission 14 may vary as a result of maintaining the speed of the engine 12 at the input engine speed and the speed of the tractor 10 at the input vehicle speed. Accordingly, the third mode 78 may be referred to as a fixed engine speed, fixed vehicle speed, and variable gear ratio mode. For example, the controller 42 may output an engine command to maintain the speed of the engine 12 at the input engine speed. In some embodiments, the controller 42 may output the engine command to the engine controller 48. The controller 42, while operating in the third mode 78, may utilize a lookup table containing ratios of vehicle speed to engine speed for each gear ratio 46 of the transmission 14. The controller 42 may maintain the input vehicle speed by first determining a target gear ratio of the input vehicle speed to the input engine speed. The controller 42 may then search the lookup table for the gear ratio 46 of the transmission 14 that provides a desired ratio of the vehicle speed to the engine speed (e.g., where the vehicle speed may be as close possible to the input vehicle speed without exceeding the input vehicle speed). The controller 42 may then output a shift command to select the determined gear ratio. In some embodiments, the controller 42 may output the shift command to the transmission controller 44. The lookup table may be stored in the memory device 56. The third mode 78 may be selected in applications in which the implement 32 is powered by the PTO shaft 20. In such cases, it may be desirable to maintain the speed of the engine 12 at a constant selected speed for efficient operation of the implement 32. In addition, it may be desirable to maintain a substantially constant speed of the tractor 10 while using the implement 32, wherein maintaining the substantially constant speed of the tractor 10 is accomplished by selecting the desired gear ratio 46.

The control system 40 may be placed in a fourth mode 80 of operation upon selection of the fourth mode 80 using the mode select control 54. While the control system 40 is in the fourth mode 80, the controller 42 may receive an input gear ratio and an input vehicle speed from the operator. In some embodiments, a controller (e.g., the controller 42) may determine an appropriate input gear ratio and an appropriate input vehicle speed of the tractor 10 based on a job or mission assigned to the tractor and/or environmental conditions. In some embodiments, a controller remote from the tractor 10 may determine the appropriate input gear ratio and the appropriate input vehicle speed of the tractor 10 and transmit the appropriate input gear ratio and the appropriate input vehicle speed to the control system 40 of the tractor 10. The controller 42, in turn, substantially maintains the gear ratio 46 of the transmission 14 at the input gear ratio and the speed of the tractor 10 at the input vehicle speed. While the control system 40 is in the fourth mode 80, the speed of the engine 12 may vary as a result of maintaining the gear ratio 46 of the transmission 14 at the input gear ratio and the speed of the tractor 10 at the input vehicle speed. Accordingly, the fourth mode 80 may be referred to as a fixed gear ratio, fixed vehicle speed, and variable engine speed mode. For example, the controller 42 may output a shift command to select the input gear ratio of the transmission 14. In some embodiments, the controller 42 may output the shift command to the transmission controller 44. The controller 42 may maintain the speed of the tractor 10 at the input vehicle speed by controlling the throttle 50 according to the speed error. The speed error may be a mathematical difference between the input vehicle speed and the measured vehicle speed. The speed error may be converted to the throttle command by multiplying the speed error by a gain. The controller 42 may then output the throttle command to control the throttle 50. In some embodiments, the controller 42 may output the throttle command to the engine controller 48. Because the gear ratio 46 of the transmission 14 remains constant, the fourth mode 80 substantially reduces or eliminates undesirable sharp or jerky movement due to shifting the gear ratio 46 of the transmission 14 (e.g., a power shift transmission). Accordingly, the fourth mode 80 of operation may be selected for applications in which fine, precise control of the tractor 10 is desired, such as during autonomous docking of another vehicle (e.g., a grain cart) with the tractor 10.

Figure 5:
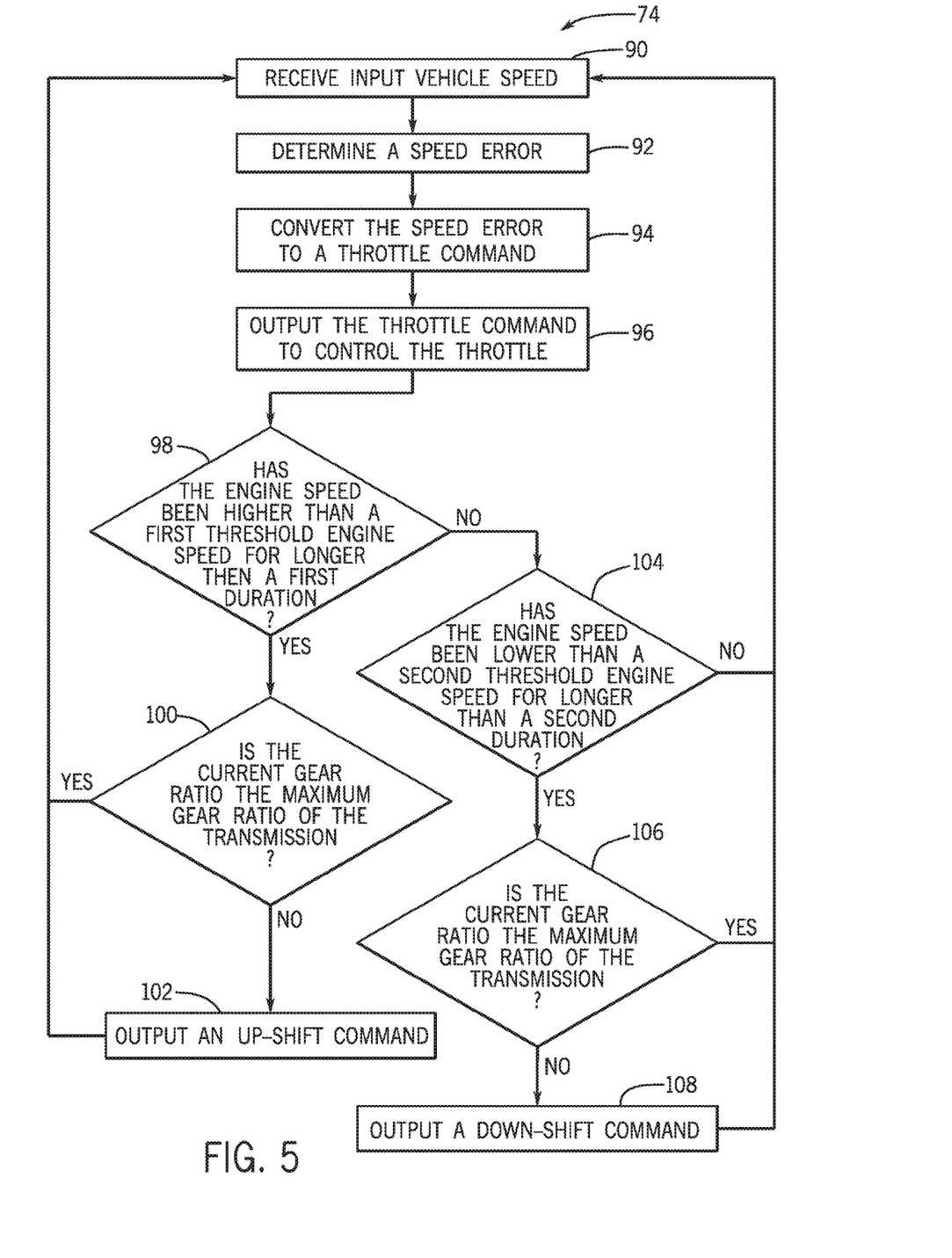
FIG. 5 is a flow diagram of a first mode of operation of a control system in accordance with an embodiment of the present disclosure.

FIG. 5 is a block diagram of the first mode 74 (i.e., a fixed vehicle speed, variable gear ratio, and variable engine speed mode) of operation of the control system 40 in accordance with an embodiment of the present disclosure. The controller 42 receives (block 90) an input vehicle speed. The controller then determines (block 92) a speed error. The speed error may be a mathematical difference between the input vehicle speed and the measured vehicle speed. The controller may convert (block 94) the speed error to a throttle command by multiplying the speed error by a gain. The controller 42 may then output (block 96) the throttle command to control the throttle 50. In some embodiments, the controller 42 may output the throttle command to the engine controller 48. The controller 42 may also output an up-shift command or a down-shift command to change the gear ratio 46 of the transmission 14. The controller 42 then determines (node 98) whether the engine speed is higher than a first threshold engine speed (e.g. approximately 1850 RPM, 1600 to 2100 RPM, etc.) for longer than a first duration (e.g., 4 seconds, 2 to 6 seconds, etc.). If so, the controller 42 determines (node 100) whether the current gear ratio 46 is the maximum gear ratio of the transmission 14. If so, the method returns to block 90. Otherwise, the controller outputs (block 102) the up-shift command to up-shift the engaged gear. In some embodiments, the controller 42 may output the up-shift command to the transmission controller 44. The method then returns to block 90. If the controller 42 does not determine (node 98) that the engine speed is higher than the first threshold engine speed for longer than the first duration, the controller 42 then determines (node 104) whether the engine speed is lower than a second threshold engine speed (e.g. approximately 1200 RPM, 1000 to 1400 RPM, etc.) for longer than a second duration (e.g., 4 seconds, 2 to 6 seconds, etc.). If not, the method returns to block 90. Otherwise, the controller 42 determines (node 106) whether the current gear ratio 46 is the minimum gear ratio of the transmission 14. If so, the method returns to block 90. Otherwise, the controller outputs (block 108) a down-shift command to reduce the gear ratio 46. In some embodiments, the controller 42 may output the down-shift command to the transmission controller 44. The method then returns to block 90.

Figure 6:
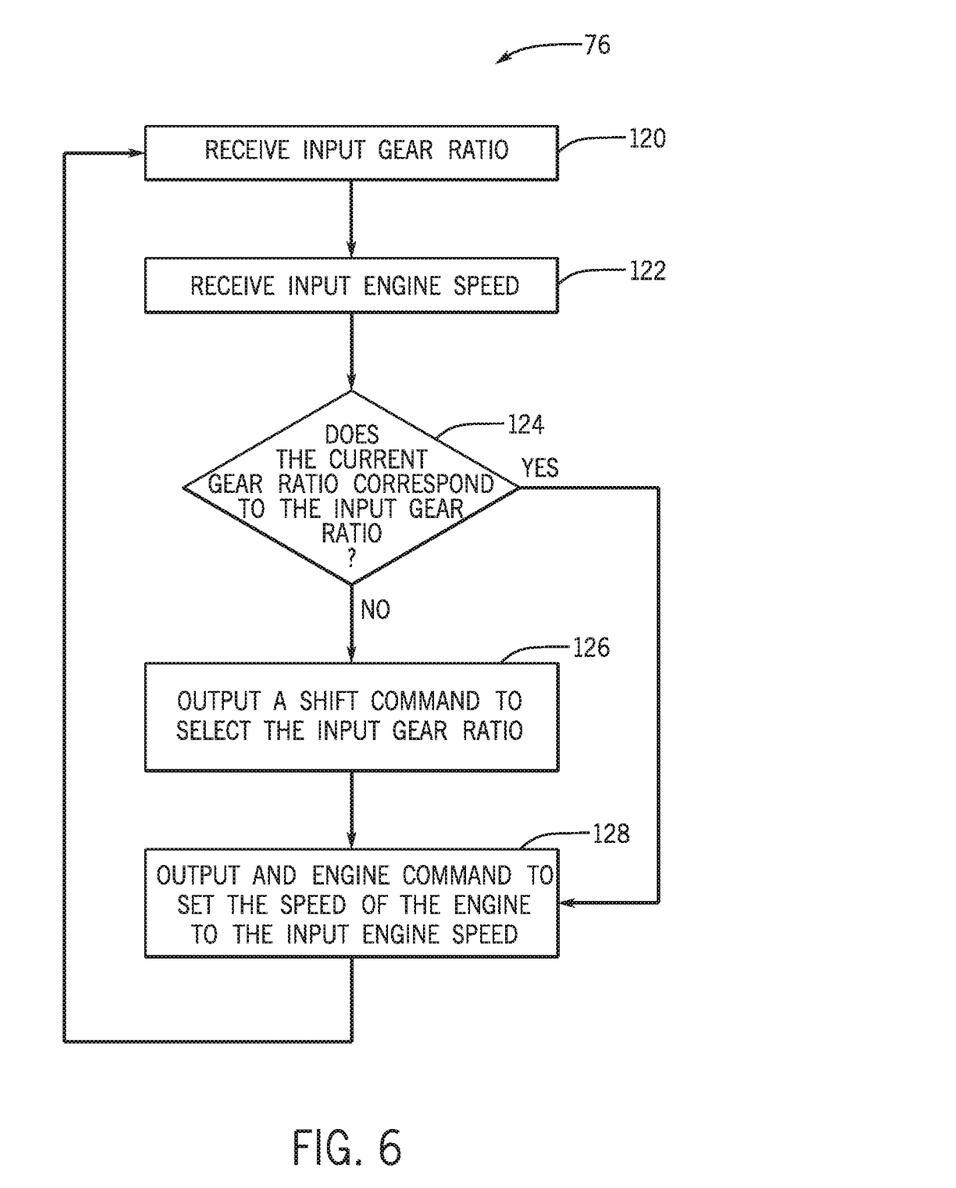
FIG. 6 is a flow diagram of a second mode of operation of a control system in accordance with an embodiment of the present disclosure.

FIG. 6 is a block diagram of the second mode 76 (i.e., a fixed gear ratio, fixed engine speed, and variable vehicle speed mode) of operation of the control system 40 in accordance with an embodiment of the present disclosure. The controller 42 receives (block 120) an input gear ratio. The controller 42 also receives (block 122) an input engine speed. The controller then determines (node 124) whether the current gear ratio 46 of the transmission 14 corresponds to the input gear ratio. If not, the controller 42 outputs (block 126) a shift command to select the input gear ratio of the transmission 14. In some embodiments, the controller 42 may output the shift command to the transmission controller 44. If the controller determines (node 124) that the current gear ratio 46 of the transmission 14 corresponds to the input gear ratio, or after the controller 42 outputs (block 126) the shift command to select the input gear ratio, the controller 42 outputs (block 128) an engine command to set the speed of the engine 12 to the input engine speed. In some embodiments, the controller 42 may output the engine command to the engine controller 48. The method then returns to block 120.

Figure 7:
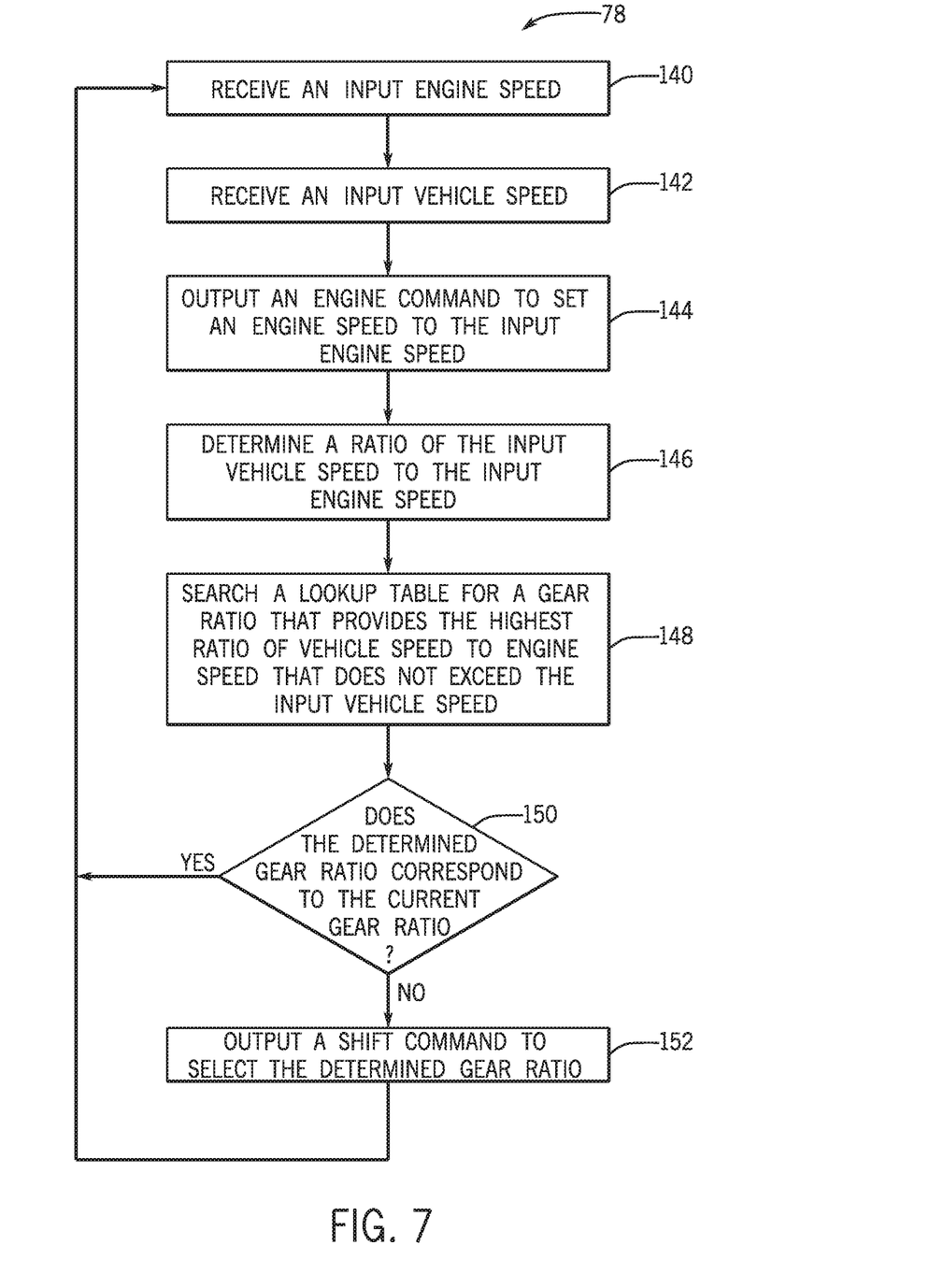
FIG. 7 is a flow diagram of a third mode of operation of a control system in accordance with an embodiment of the present disclosure.

FIG. 7 is a block diagram of the third mode 78 (i.e., a fixed engine speed, fixed vehicle speed, and variable gear ratio mode) of operation of the control system 40 in accordance with an embodiment of the present disclosure. The controller 42 receives (block 140) an input engine speed. The controller 42 also receives (block 142) an input vehicle speed. The controller 42 then outputs (block 144) an engine command to set a speed of the engine 12 to the input engine speed. In some embodiments, the controller 42 may output the engine command to the engine controller 48. The controller 42 determines (block 146) the target gear ratio of the input vehicle speed to the input engine speed. The controller 42 searches (block 148) a lookup table for a gear ratio 46 that provides a highest ratio of vehicle speed to engine speed that does not exceed the input vehicle speed. The controller 42 then determines (node 150) whether the determined gear ratio 46 corresponds to the current gear ratio. If not, the controller outputs (block 152) a shift command to select the determined gear ratio. In some embodiments, the controller 42 may output the shift command to the transmission controller 44. The lookup table may be stored in the memory device 56. The method then returns to block 140.

Figure 8:
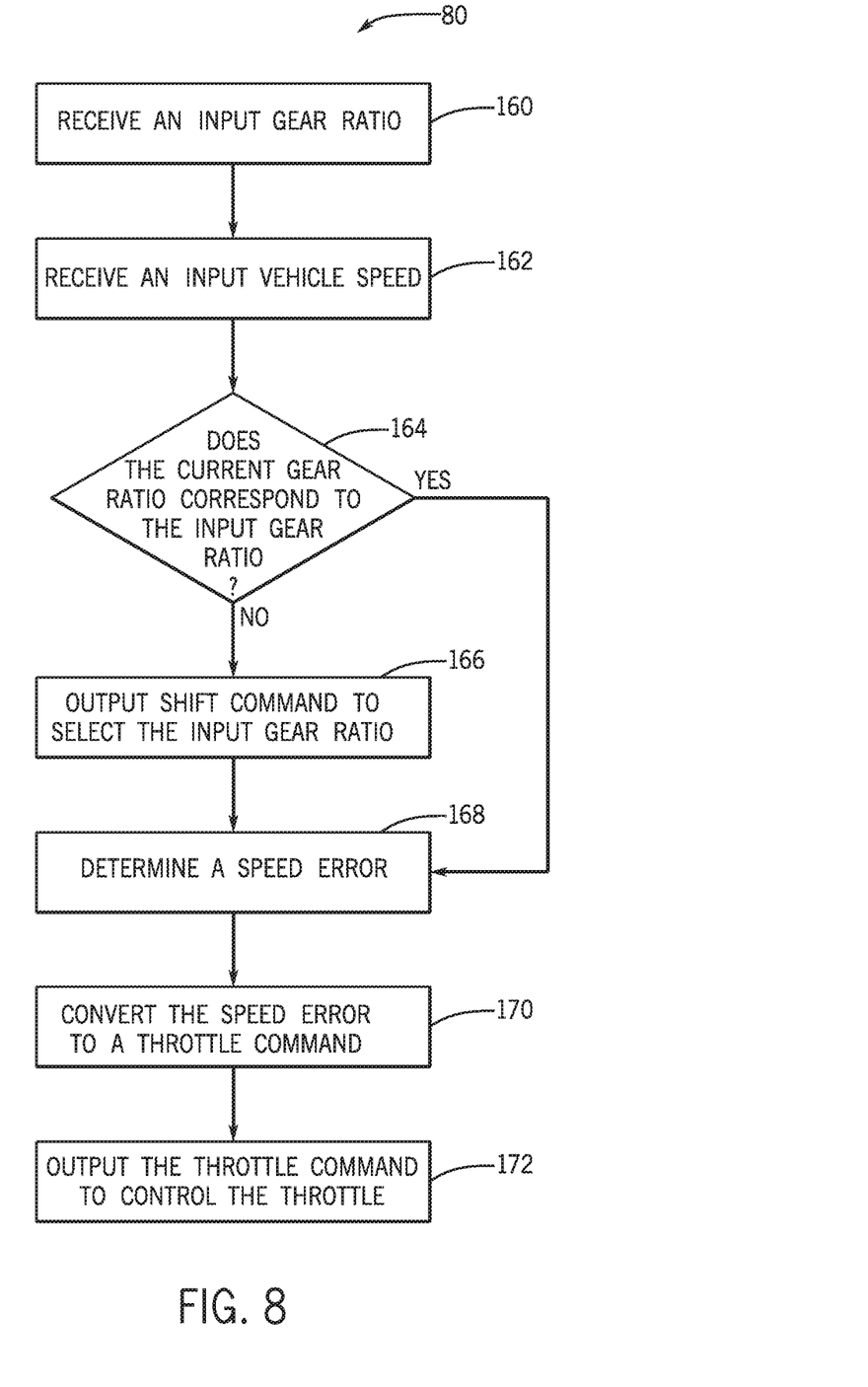
FIG. 8 is a flow diagram of a fourth mode of operation of a control system in accordance with an embodiment of the present disclosure.

FIG. 8 is a block diagram of the fourth mode 80 (i.e., a fixed gear ratio, fixed vehicle speed, and variable engine speed mode) of operation of the control system 40 in accordance with an embodiment of the present disclosure. The controller 42 receives (block 160) an input gear ratio. The controller 42 also receives (block 162) an input vehicle speed. The controller determines (node 164) whether the current gear ratio 46 of the transmission 14 corresponds to the input gear ratio. If not, the controller 42 outputs (block 166) a shift command to select the input gear ratio of the transmission 14. In some embodiments, the controller 42 may output the shift command to the transmission controller 44. If the controller determines (node 164) that the current gear ratio 46 of the transmission 14 corresponds to the input gear ratio or after the controller 42 outputs (block 166) the shift command to select the input gear ratio, the controller determines (block 168) the speed error. The speed error may be a mathematical difference between the input vehicle speed and the measured vehicle speed. The controller may convert (block 170) the speed error to a throttle command by multiplying the speed error by a gain. The controller 42 then outputs (block 172) the throttle command to control the throttle 50. In some embodiments, the controller 42 may output the throttle command to the engine controller 48. The method then returns to block 160.

Figure 9:
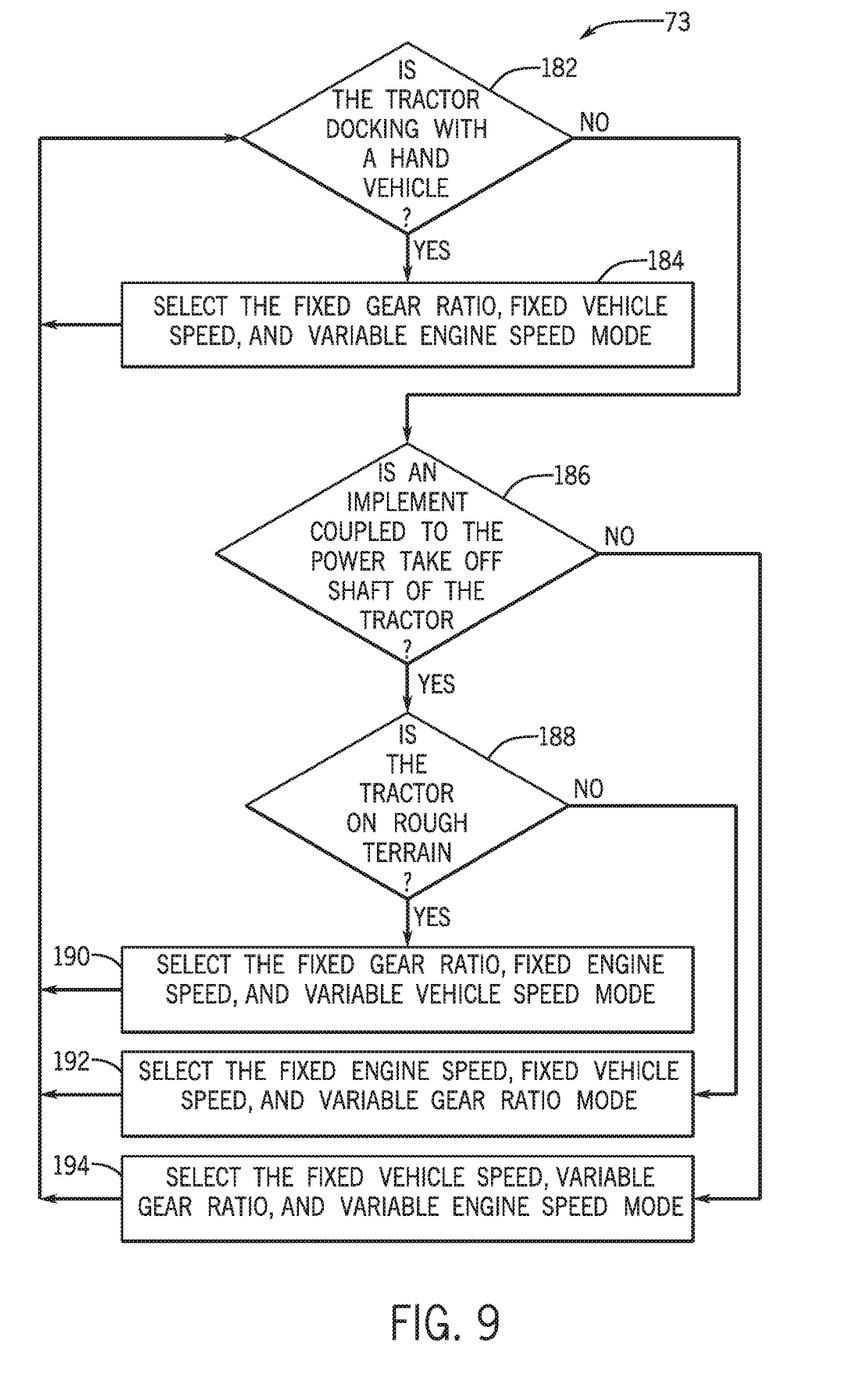
FIG. 9 is a flow diagram of an automatic selection mode of operation of a control system in accordance with an embodiment of the present disclosure.

FIG. 9 is a flow diagram of an automatic selection mode 180 of operation of the control system 40 in accordance with an embodiment of the present disclosure. The automatic selection mode 180 enables the control system 40 to select a mode of operation (e.g., the first mode 74, the second mode 76, the third mode 78, or the fourth mode 80) automatically (rather than having an operator select the mode of operation). The controller 42 determines (node 182) whether the tractor 10 is docking with another vehicle. The controller 42 may determine whether the tractor 10 is docking with another vehicle by receiving a signal from a sensor 60 of the tractor 10 indicative of a parameter associated with the tractor 10. In some embodiments, a mission plan transmitted to the control system 40 of the tractor 10 may indicate that the tractor 10 is to dock with another vehicle via a user interface (e.g., the user interface 52). The mission plan may be transmitted (e.g., wirelessly) from a base station remote to the tractor 10, and may be used to control the tractor 10 to implement the mission plan. If so, the controller 42 selects (block 184) the fourth mode 80 (i.e., the fixed gear ratio, fixed vehicle speed, and variable engine speed mode) of operation of the control system 40 automatically. The method then returns to node 182.

If the controller 42 determines (node 182) that the tractor 10 is not docking with another vehicle, the controller 42 determines (node 186) whether an implement 32 is coupled to the PTO shaft 20 of the tractor 10, such that the PTO shaft 20 powers certain components on the implement 32. If so, the controller 42 determines whether the tractor 10 is on rough or bumpy terrain. The controller 42 may determine (node 188) whether the tractor 10 is on rough or bumpy terrain by receiving a signal from a sensor 60 of the tractor 10 indicative of a parameter associated with the tractor 10. In some embodiments, a mission plan transmitted to the control system 40 of the tractor 10 may indicate that the tractor 10 is on rough or bumpy terrain. If so, the controller 42 selects (block 190) the second mode 76 (i.e., a fixed gear ratio, fixed engine speed, and variable vehicle speed mode) of operation of the control system 40 automatically. In some embodiments, a mission plan transmitted to the control system 40 of the tractor 10 may instruct the controller 42 to select the second mode 76. The method then returns to node 182.

If the controller 42 determines (node 188) that the tractor 10 is not on rough or bumpy terrain, then the controller 42 selects (block 192) the third mode 78 (i.e., a fixed engine speed, fixed vehicle speed, and variable gear ratio mode) of operation of the control system 40 automatically. In some embodiments, a mission plan transmitted to the control system 40 of the tractor 10 may instruct the controller 42 to select the third mode 78. The method then returns to node 182.

If the controller 42 determines (node 186) that an implement 32 is not coupled to the PTO shaft 20 of the tractor 10, then the controller 42 selects (block 194) the first mode 74 (i.e., a fixed vehicle speed, variable gear ratio, and variable engine speed mode) of operation of the control system 40 automatically. In some embodiments, a mission plan transmitted to the control system 40 of the tractor 10 may instruct the controller 42 to select the first mode 74. The method then returns to node 182.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling an off-road vehicle, comprising:
receiving, via a mode select control, a selection of a candidate operating mode from a plurality of candidate operating modes, wherein the plurality of candidate operating modes comprises:
a first operating mode comprising substantially maintaining a first desired vehicle speed of the off-road vehicle by controlling an engine of the off-road vehicle and a transmission of the off-road vehicle to reduce a speed error, wherein the speed error is a difference between the first desired vehicle speed and a measured vehicle speed of the off-road vehicle;
a second operating mode comprising substantially maintaining a first desired gear ratio of the transmission and substantially maintaining a first desired engine speed of the engine by instructing the transmission to maintain the first desired gear ratio and instructing the engine to maintain the first desired engine speed;
a third operating mode comprising substantially maintaining a second desired vehicle speed of the off-road vehicle and substantially maintaining a second desired engine speed of the engine by instructing the engine to maintain the second desired engine speed and controlling the transmission to establish a second desired gear ratio of the transmission that substantially maintains the second desired vehicle speed; and
a fourth operating mode comprising substantially maintaining a third desired gear ratio of the transmission and substantially maintaining a third desired vehicle speed of the off-road vehicle by instructing the transmission to maintain the third desired gear ratio and controlling the engine to establish a third desired engine speed that substantially maintains the third desired vehicle speed; and
instructing, via the mode select control, a controller communicatively coupled to the transmission and the engine to operate the transmission and the engine in the candidate operating mode of the plurality of candidate operating modes.

2. The method of claim 1, wherein controlling the engine of the off-road vehicle and the transmission of the off-road vehicle to reduce the speed error comprises:
actuating a throttle of the engine based at least in part on the speed error;
increasing a gear ratio of the transmission in response to determining that an engine speed of the engine is greater than a first engine speed threshold for longer than a first duration and the gear ratio is not equal to a maximum gear ratio of the transmission; and
decreasing the gear ratio in response to determining that the engine speed is less than a second engine speed threshold for longer than a second duration and the gear ratio is not equal to a minimum gear ratio of the transmission.

3. The method of claim 2, wherein decreasing the gear ratio comprises determining a maximum gear ratio that enables the engine to maintain a minimum engine speed.

4. The method of claim 1, wherein controlling the transmission to establish the second desired gear ratio that substantially maintains the second desired vehicle speed comprises:
 determining a target gear ratio based at least in part on the second desired vehicle speed to the second desired engine speed;
 selecting the second desired gear ratio such that the second desired gear ratio is closest to the target gear ratio and less than or equal to the target gear ratio; and
 instructing the transmission to maintain the second desired gear ratio.

5. The method of claim 4, wherein determining the target gear ratio comprises utilizing a lookup table comprising ratios of a vehicle speed of the off-road vehicle to an engine speed of the engine for each gear ratio of the transmission.

6. The method of claim 1, wherein controlling the engine to establish the third desired engine speed that substantially maintains the third desired vehicle speed comprises:
 determining the third desired engine speed of the engine that establishes the third desired vehicle speed by utilizing a lookup table comprising ratios of vehicle speeds of the off-road vehicle to engine speeds of the engine for each gear ratio of the transmission; and
 instructing the engine to maintain the third desired engine speed.

7. The method of claim 1, wherein receiving, via the mode select control, the selection of the candidate operating mode from the plurality of candidate operating modes comprises:
 receiving a signal from a sensor; and
 selecting the candidate operating mode based at least in part on the signal.

8. A system of an off-road vehicle, comprising:
 an engine;
 a transmission coupled to the engine, wherein a gear ratio of the transmission is adjustable; and
 a controller configured to:
  substantially maintain a first desired vehicle speed of the off-road vehicle by controlling the engine and the transmission to reduce a speed error, wherein the speed error is a difference between the first desired vehicle speed and a measured vehicle speed of the off-road vehicle;
  substantially maintain a first desired gear ratio of the transmission and substantially maintain a first desired engine speed of the engine by instructing the transmission to maintain the first desired gear ratio and instructing the engine to maintain the first desired engine speed;
  substantially maintain a second desired vehicle speed of the off-road vehicle and substantially maintaining a second desired engine speed of the engine by instructing the engine to maintain the second desired engine speed and controlling the transmission to establish a second desired gear ratio of the transmission that substantially maintains the second desired vehicle speed; and
  substantially maintain a third desired gear ratio of the transmission and substantially maintaining a third desired vehicle speed of the off-road vehicle by instructing the transmission to maintain the third desired gear ratio and controlling the engine to establish a third desired engine speed that substantially maintains the third desired vehicle speed.

9. The system of claim 8, wherein controlling the engine and the transmission to reduce the speed error comprises:
 actuating a throttle of the engine according to the speed error, wherein actuating the throttle comprises converting the speed error to a throttle command by multiplying the speed error by a gain.

10. The system of claim 8, wherein controlling the engine and the transmission to reduce the speed error comprises:
 increasing a current gear ratio of the transmission in response to determining that a current engine speed of the engine is greater than a first engine speed threshold for longer than a first duration and the gear ratio is not equal to a maximum gear ratio of the transmission; and
 decreasing the current gear ratio in response to determining that the current engine speed is less than a second engine speed threshold for longer than a second duration and the gear ratio is not equal to a minimum gear ratio of the transmission.

11. The system of claim 10, wherein the first duration or the second duration is approximately four seconds.

12. The system of claim 10, where the first engine speed threshold is approximately 1850 revolutions per minute, and the second engine speed threshold is approximately 1200 revolutions per minute.

13. The system of claim 8, wherein the off-road vehicle is autonomous.

14. A method for controlling an autonomous off-road vehicle, comprising:
 selecting, via a controller, a fourth mode of operation of a control system of the autonomous off-road vehicle upon detecting, via a sensor, that the autonomous off-road vehicle is docking with another vehicle, wherein the fourth mode of operation comprises substantially maintaining a third desired gear ratio of a transmission of the autonomous off-road vehicle and substantially maintaining a third desired vehicle speed of the autonomous off-road vehicle by instructing the transmission to maintain the third desired gear ratio and controlling an engine of the autonomous off-road vehicle to establish a third desired engine speed of the engine that substantially maintains the third desired vehicle speed;
 selecting, via the controller, a second mode of operation of the control system of the autonomous off-road vehicle upon detecting, via the sensor, that an implement is coupled to a power takeoff shaft of the autonomous off-road vehicle and the autonomous off-road vehicle is on rough terrain, wherein the second mode of operation comprises substantially maintaining a first desired gear ratio of the transmission and substantially maintaining a first desired engine speed of the engine by instructing the transmission to maintain the first desired gear ratio and instructing the engine to maintain the first desired engine speed;
 selecting, via the controller, a third mode of operation of the control system of the autonomous off-road vehicle upon detecting, via the sensor, that the implement is coupled to the power takeoff shaft of the autonomous off-road vehicle and the autonomous off-road vehicle is not on rough terrain, wherein the third mode of operation comprises substantially maintaining a second desired vehicle speed of the autonomous off-road vehicle and substantially maintaining a second desired engine speed of the engine by instructing the engine to maintain the second desired engine speed and controlling the transmission to establish a second desired gear ratio of the transmission that substantially maintains the second desired vehicle speed; and selecting, via the controller, a first mode of operation of the control system upon detecting, via the sensor, that the autonomous off-road vehicle is not docking with another vehicle and the implement is not coupled to the power takeoff shaft of the autonomous off-road vehicle, wherein the first mode of operation comprises substantially maintaining a first desired vehicle speed of the autonomous off-road vehicle by controlling the engine and the transmission to reduce a speed error, wherein the speed error is a difference between the first desired vehicle speed and a measured vehicle speed of the autonomous off-road vehicle.

15. The method of claim 14, wherein detecting, via the sensor, whether the autonomous off-road vehicle is docking with another vehicle comprises receiving a mission plan, a signal from a sensor of the autonomous off-road vehicle, or a combination thereof.

16. The method of claim 14, wherein detecting, via the sensor, whether an implement is coupled to a power takeoff shaft of the autonomous off-road vehicle comprises receiving a mission plan, a signal from a sensor of the autonomous off-road vehicle, or a combination thereof.

17. The method of claim 14, wherein detecting, via the sensor, whether the autonomous off-road vehicle is on rough terrain comprises receiving a mission plan, a signal from a sensor of the autonomous off-road vehicle, or a combination thereof.

18. The method of claim 14, wherein the autonomous off-road vehicle is operated without an operator in the autonomous off-road vehicle.

19. The method of claim 14, wherein the implement comprises a tillage implement, a mower, or a seeder.

* * * * *